(12) United States Patent
Ruden et al.

(10) Patent No.: US 7,757,834 B2
(45) Date of Patent: Jul. 20, 2010

(54) WORKPIECE PRESENTMENT TO A PROCESSING DEVICE

(75) Inventors: Shawn Allen Ruden, Longmont, OK (US); Richard Gordon Goodrich, Lakeville, MN (US); Michael William Pfeiffer, Savage, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 417 days.

(21) Appl. No.: 11/942,505

(22) Filed: Nov. 19, 2007

(65) Prior Publication Data

US 2009/0129898 A1 May 21, 2009

(51) Int. Cl.
*B65G 37/00* (2006.01)
(52) U.S. Cl. ............... 198/346.1; 198/345.3; 198/463.2; 198/465.2
(58) Field of Classification Search ............... 198/346.1, 198/463.2, 465.2, 345.1, 345.3, 346.2, 457.07
See application file for complete search history.

(56) References Cited

U.S. PATENT DOCUMENTS

| | | | | |
|---|---|---|---|---|
| 5,205,026 A | * | 4/1993 | Sticht | 29/33 P |
| 5,363,785 A | * | 11/1994 | Conley, Jr. | 112/470.06 |
| 5,826,692 A | * | 10/1998 | Blanc | 198/346.1 |
| 5,884,746 A | * | 3/1999 | Leisner et al. | 198/346.1 |
| 6,745,454 B1 | * | 6/2004 | Grimshaw et al. | 29/563 |
| 7,063,204 B1 | | 6/2006 | Pfeiffer | |
| 7,182,024 B2 | | 2/2007 | Pfeiffer | |
| 2003/0057060 A1 | * | 3/2003 | Richardson | 198/580 |
| 2006/0090332 A1 | * | 5/2006 | Taban | 29/748 |
| 2008/0053790 A1 | * | 3/2008 | Itoh | 198/346.1 |

* cited by examiner

*Primary Examiner*—Mark A Deuble
(74) *Attorney, Agent, or Firm*—McCarthy Law Group

(57) ABSTRACT

A workpiece presentment system and associated method for workpiece presentment with a pick and place device is provided. The system includes a pair of parallel stationary rails, and first and second shuttle rails respectively disposed adjacent first and second ends of the stationary rails. Each shuttle rail is independently moveable laterally to a longitudinal alignment with a selected one of the pair of stationary rails. A control circuit is configured to circulate only two pallets simultaneously in the same rectangular path of travel to load trays to the pallets on one of the stationary rails while presenting the trays to the pick and place device on the other stationary rail.

20 Claims, 9 Drawing Sheets

WORKPIECE PRESENTMENT TO A PROCESSING DEVICE

BACKGROUND

Manufacturing operations have significantly evolved in complexity through the integration of sophisticated automation devices and associated methods. Gains have been realized both in productivity and reliability as past reliance on human judgment and manipulation has been replaced by processor-based systems.

An example of this is manifested in the sophistication of production equipment used at final assembly. Manufacturers are continually striving to replace manual assembly operations with highly complex processor controlled automated systems. They are reengineering existing factories to pull components through the manufacturing process and assemble them just in time at final assembly, instead of batch processing of subassemblies as was more prevalent in the past.

But any gains in speed and repeatability from automating are forfeited if flexibility is forsaken. For example, given no constraints in the way of budget, space, time, and assembly line changeovers, the skilled artisan can likely construct a dedicated purpose robot for a given process. Pick and place robots, for example, usually consist of adversely large, complex, and expensive three axis manipulators moving between a queue of workpieces and an assembly line. What is lacking is a compact and highly flexible system that is adaptable for changing the workpieces it processes on the fly, that maximizes process utilization by minimizing the travel between the workpiece queue and the point of assembly, and that operates at near 100% utilization with respect to continuously supplying the next workpiece in the queue for picking and placing. It is to those needed improvements in the art that the claimed embodiments are directed.

SUMMARY

Embodiments of the present invention are generally directed to workpiece presentment devices in an automated processing environment.

In some embodiments a workpiece presentment system and associated method for workpiece presentment with a pick and place device is provided. The system includes a pair of parallel stationary rails, and first and second shuttle rails respectively disposed adjacent first and second ends of the stationary rails. Each shuttle rail is independently moveable laterally to a longitudinal alignment with a selected one of the pair of stationary rails. A control circuit is configured to circulate two pallets simultaneously in the same rectangular path of travel to load trays to the pallets on one of the stationary rails while presenting the trays to the pick and place device on the other stationary rail.

These and various other features and advantages which characterize the claimed embodiments will become apparent upon reading the following detailed description and upon reviewing the associated drawings.

DETAILED DESCRIPTION

Figure 1:
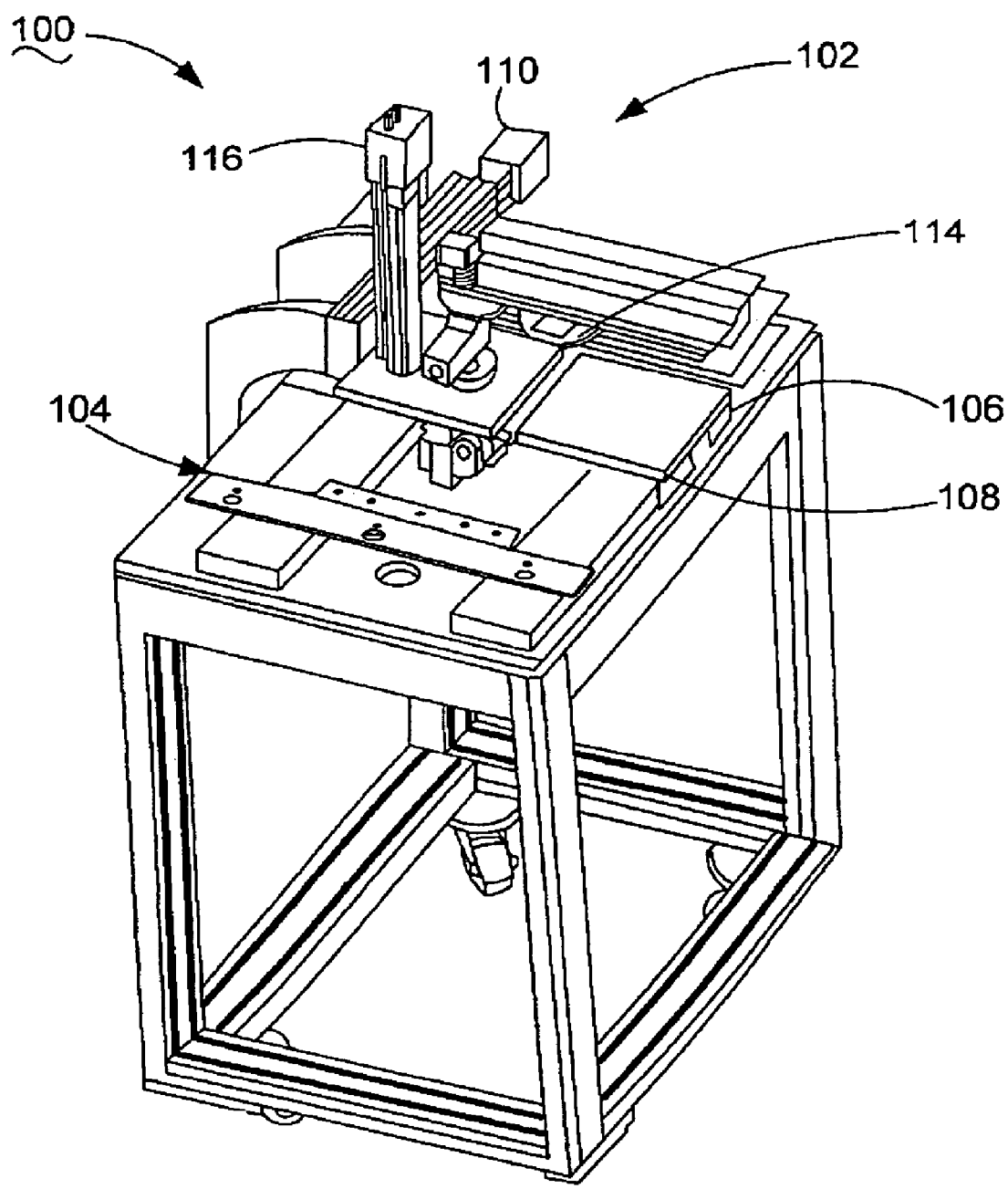
FIG. 1 is an isometric depiction of a workpiece presentment system that is constructed in accordance with embodiments of the claimed invention.

Referring to the drawings in general, and for now more particularly to FIG. 1 that shows a workpiece presentment system 100 that is constructed in accordance with the claimed embodiments. The workpiece presentment system 100 generally has a pick and place device 102 and a tray feeder 104. The tray feeder 104 presents a continuous supply of workpieces 106 that are packaged in rows in a tray 108.

In the illustrative embodiments the pick and place device 102 has freedom of movement in two axes. A horizontal gantry 110 moves an end effector 112 (FIG. 2) between workpieces 106 in the currently presented tray 108 and an assembly line 114. The elevation of the end effector 112 is controlled by a z-axis fluid powered cylinder 116.

Figure 2:
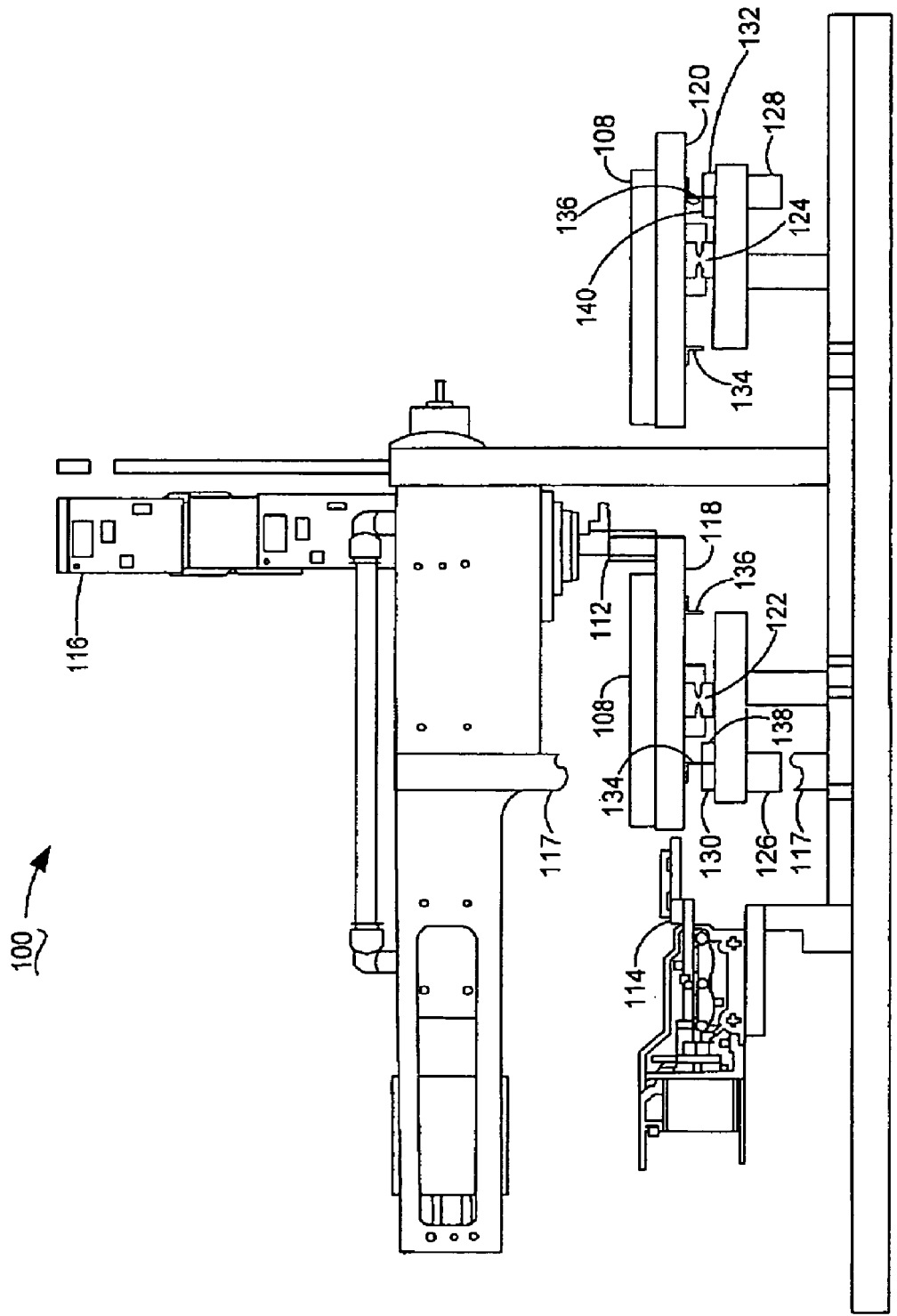
FIG. 2 is an elevational depiction of the workpiece presentment system of FIG. 1.

FIG. 2 depicts a side elevational view of the workpiece presentment system 100. Note that one of the support members 117 is depicted in tear away fashion in order to more clearly view the things of interest. FIG. 2 shows the trays 108 being carried by pallets 118, 120 that are, in turn, supported by stationary rails 122, 124, respectively. As will become clear below, the pallet 118 is also sometimes supported by the stationary rail 124, and the pallet 120 is also sometimes supported by the stationary rail 122.

Motors 126, 128 drive respective powered rollers 130, 132. A pair of tangs 134, 136 depends from each of the respective pallets 118, 120. One of the tangs 134, 136 is frictionally engaged between the powered rollers 130, 132 and a pinch roller 138, 140. It will be noted that the tang 134 of pallet 118 is engaged for moving it on the stationary rail 122, while the other tang 136 of pallet 120 is engaged for moving it on the stationary rail 124. The reason for two tangs 134, 136 will be clear below in the description of how the pallets 118, 120 are shuttled to the stationary rails 122, 124. Positional control of each pallet 118, 120 as it is moved longitudinally along the rails 122, 124 is provided by a linear encoder, which may be integral to the rails 122, 124 or a separate component thereof.

Figure 3:
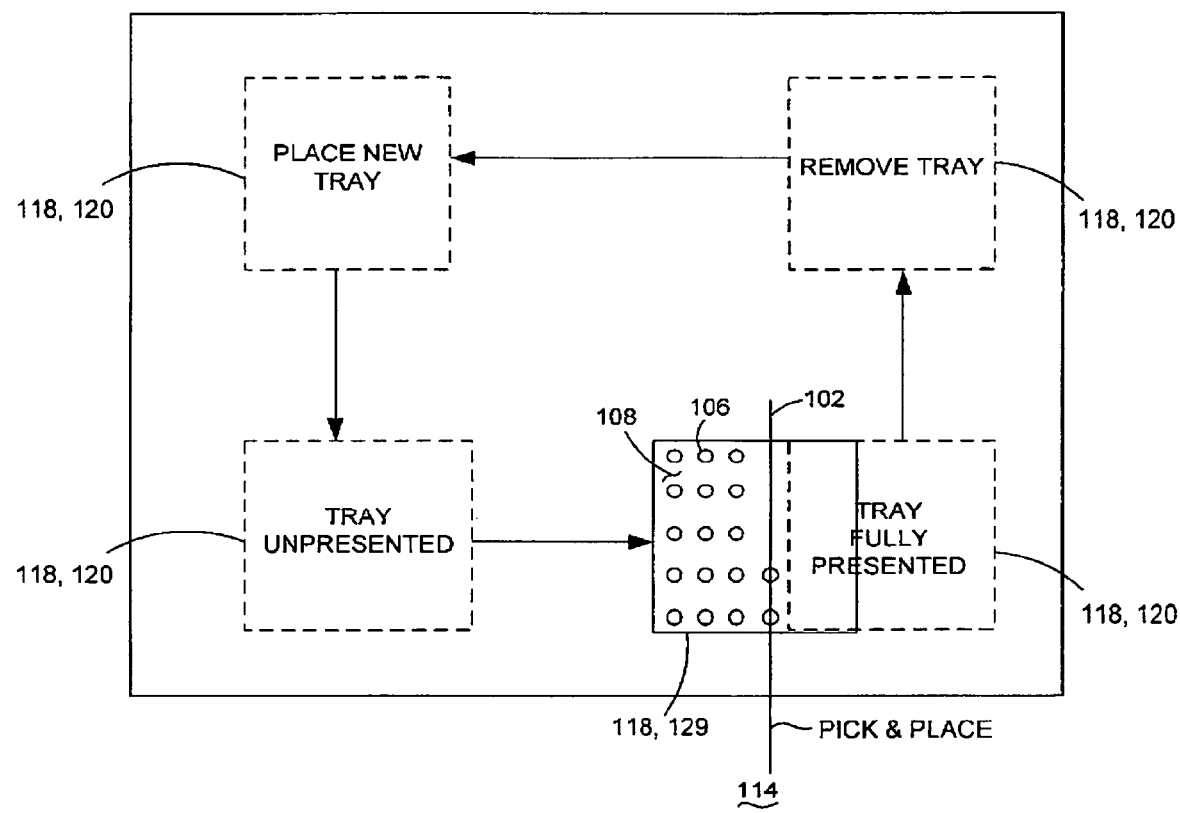
FIG. 3 diagrammatically depicts the rectangular path of travel taken by both pallets in the workpiece presentment system of FIG. 1.

FIG. 3 is a diagrammatic depiction of the rectangular path of travel through which both pallets 118, 120 traverse in order to continuously present workpieces 106 to the pick and place device 102. In these illustrative embodiments the pick and place device 102 processes the workpieces 106, depicted as there being five workpieces 106 in each row, from the tray 108 to the assembly line 114. It will be understood that in alternative equivalent embodiments the reverse may occur; that is, the pick and place device 102 can process workpieces 106 from the assembly line 114 to the trays 108.

The tray 108 depicted in solid lines is currently presenting rows of the workpieces 106 to the pick and place device 102. Two workpieces 106 have yet to be picked from the tray 108 in the currently presented row. After the last of those two workpieces 106 is picked, the pallet 118, 120 supporting the tray 108 will incrementally it, by an amount corresponding to the distance between two adjacent rows, in order to present the next row of workpieces 106 to the pick and place device 102.

In the corners of the rectangular path of travel different states and/or activities are depicted by pallets 118, 120 drawn in broken lines. For example, when the tray 108 traverses to the lower right hand corner it has been fully presented to the pick and place device 102. In other words, in this illustrative example the tray 108 has been emptied of all workpieces 106. The pallet 118, 120 then shuttles laterally to the upper right-hand corner where the fully presented tray 108 is removed from the pallet 118, 120. The pallet 118, 120 then moves to the left-hand corner where a new tray 108 is placed on the pallet 118, 120. The removal of trays 108 from the pallet 118, 120 and the placing new trays 108 to the pallet 118, 120 is preferably performed by an automated process, as described below. The new tray 108 is then shuttled laterally again into operable alignment with the pick and place device 102.

The two pallets 118, 120 independently traverse this same rectangular path of travel so that during the time that one of them is presenting workpieces 106 to the pick and place device 102, the other one is unloading its fully presented tray 108 and receiving a new tray 108. The sequencing is preferably timed so that before the current tray 108 is fully presented, the next unpresented tray 108 has been reoriented in the end-to-end relationship. That way, the cycle time associated with processing workpieces in the last row of one tray 108 and the first row of another tray 108 is substantially the same as the cycle time associated with processing any two adjacent rows in one tray 108.

Figure 4:
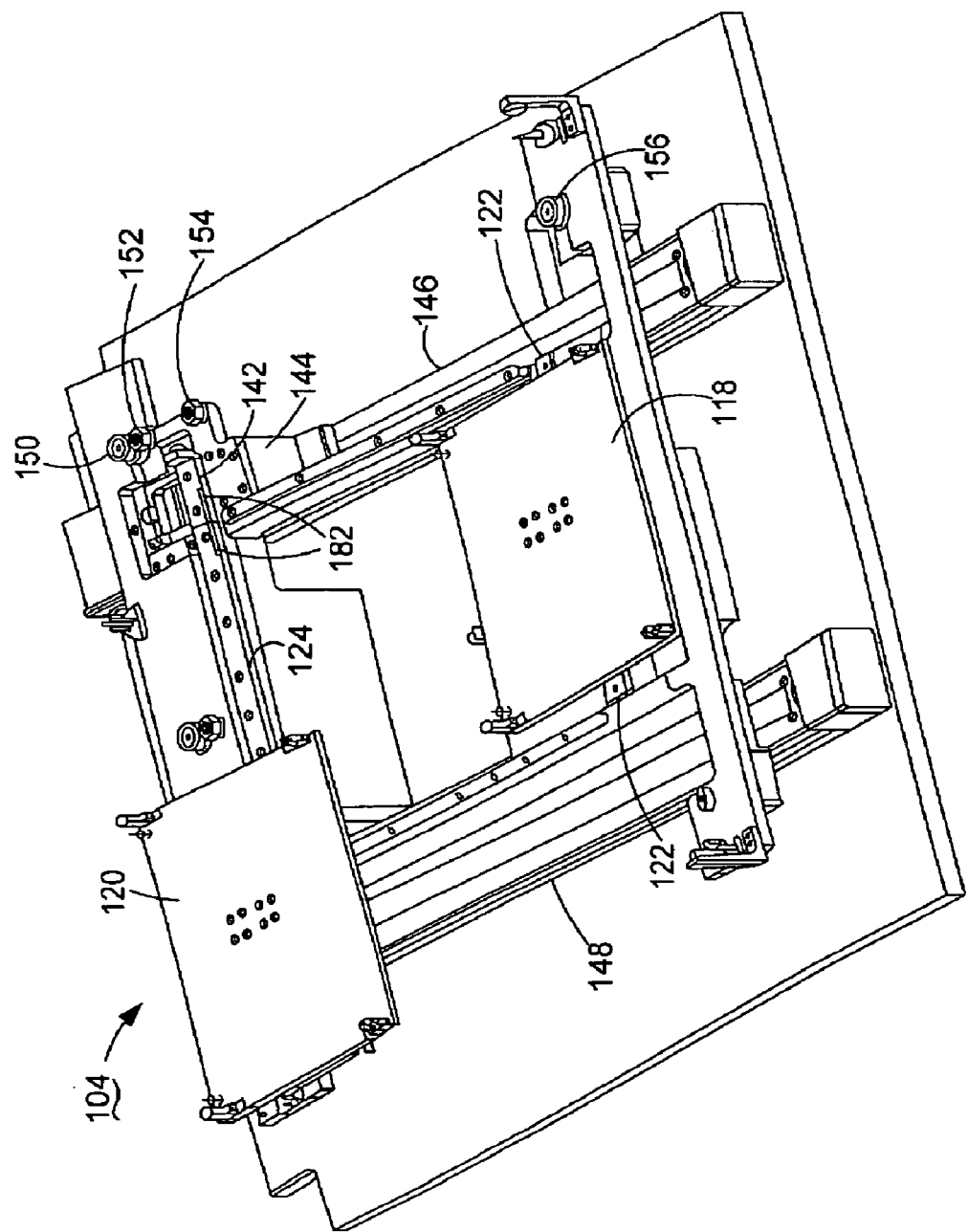
FIG. 4 isometrically depicts the tray feeder of the workpiece presentment system of FIG. 1.

FIG. 4 is an isometric depiction of the tray feeder 104 at a time when the pallet 118 is in position to present a tray 108 to the pick and place device 102, while the pallet 120 is in position to receive a new tray. To shuttle the pallets 118, 120 between the two stationary rails 122, 124, a shuttle rail 142 is supported by a base 144 which is, in turn, subject to lateral positioning as determined by a fluid cylinder 146. Another shuttle rail 143 (FIG. 11) is likewise moved laterally by a fluid cylinder 148 at the other end of the stationary rails 122, 124. The shuttle rail 143 is hidden from view in FIG. 4 by the pallet 120 that is supported upon it. The shuttle rails 142, 143 are moveable independently of each other by independent actuation of the respective fluid powered cylinders 146, 148.

The shuttle rail 142 in FIG. 4 is still in alignment with the stationary rail 124 from having previously shuttled the pallet 120 from the stationary rail 122. As pallet 122 continues to traverse the rectangular path of travel in a counterclockwise direction, eventually the shuttle rail 142 will return to an alignment with the stationary rail 122.

As discussed previously, pallet 120 includes a pair of downwardly projecting tangs 134, 136. Tang 136 was previously sandwichingly engaged between a powered roller 150 and a pinch roller 152 as the pallet 120 was transferred longitudinally from the shuttle rail 142 to the stationary rail 124. While the powered roller 150 is fixed in place, the pinch roller 152 and another pinch roller 154 are supported by the base 144, and thereby they both move laterally with the shuttle rail 142. When the shuttle rail 142 is moved back to alignment with the stationary rail 122, the pinch roller 154 will pair with another powered roller 156 to transfer the pallet 118 from the stationary rail 122 to the shuttle rail 142.

Figure 5:
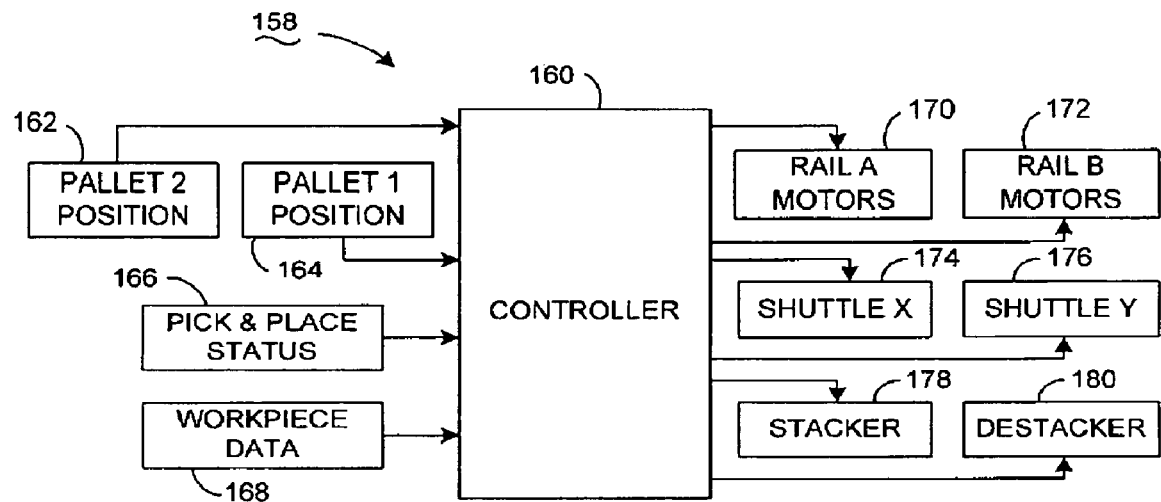
FIG. 5 is a functional block depiction of the control circuit of the workpiece presentment system of FIG. 1.

FIG. 5 is a functional block diagram depicting a control circuit 158 that is capable of circulating the two pallets 118, 120 along the same rectangular path of travel to load trays 108 to the pallets 118, 120 on one of the stationary rails 124 while simultaneously presenting the trays 108 to the pick and place device 102 on the other of the stationary rails 122. A processor based controller 160 receives pallet position data from the linear encoders associated with the respective stationary rails 122, 124 in blocks 162, 164. The controller 160 is informed by block 166 when the pick and place device 102 has completed processing on a presented row, and on a presented tray 108 for that matter. Workpiece information is provided in block 168 that indicates such things as the incremental distance between rows in the tray 108, the number of rows in the tray 108, and the number of trays 108 to be processed.

From that input data the controller 160 powers the sets of motors driving the powered rollers represented by blocks 170, 172 to selectively position the pallets 118, 120. In blocks 174, 176 the controller 160 actuates the cylinders 146, 148 to move the pallets 118, 120 between the two stationary rails 122, 124. Dwell time for tray stacker and destacker operations are controlled in blocks 178, 180 to remove a fully presented tray from the pallet 118, 120 and place an unpresented tray to the same pallet 118, 120, respectively.

Figure 6:
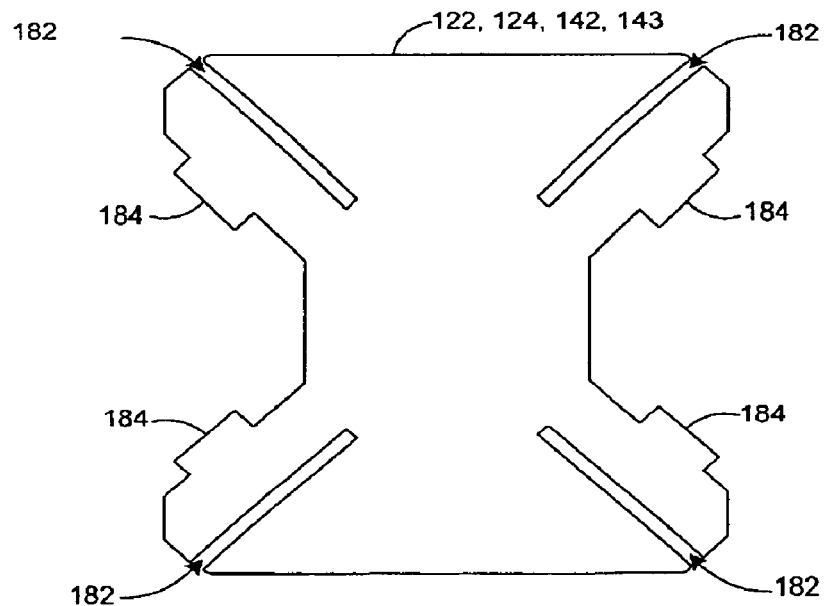
FIG. 6 depicts an end view of the stationary rails and the shuttle rails.

Slight longitudinal misalignments can occur between the shuttle rails 142, 143 and the stationary rails 122, 124 as the shuttle rails 142, 143 are moved back and forth. To compensate for any such misalignments, ends of both the stationary rails 122, 124 and the shuttle rails 142, 143 can be provided with longitudinally extending slits 182 (FIG. 4). FIG. 6 is an end view of the stationary rails 122, 124 and the shuttle rails 142, better showing the slits 182. In this illustrative embodiment there are four bearing surfaces 184 that supportingly engage the pallet 118, 120 and its contents. Each bearing surface 184 is deflectable by the adjacent slit 182, providing a smoother transition as the bearings transition between the stationary rails 122, 124 and the shuttle rails 142, 143.

Figure 7:
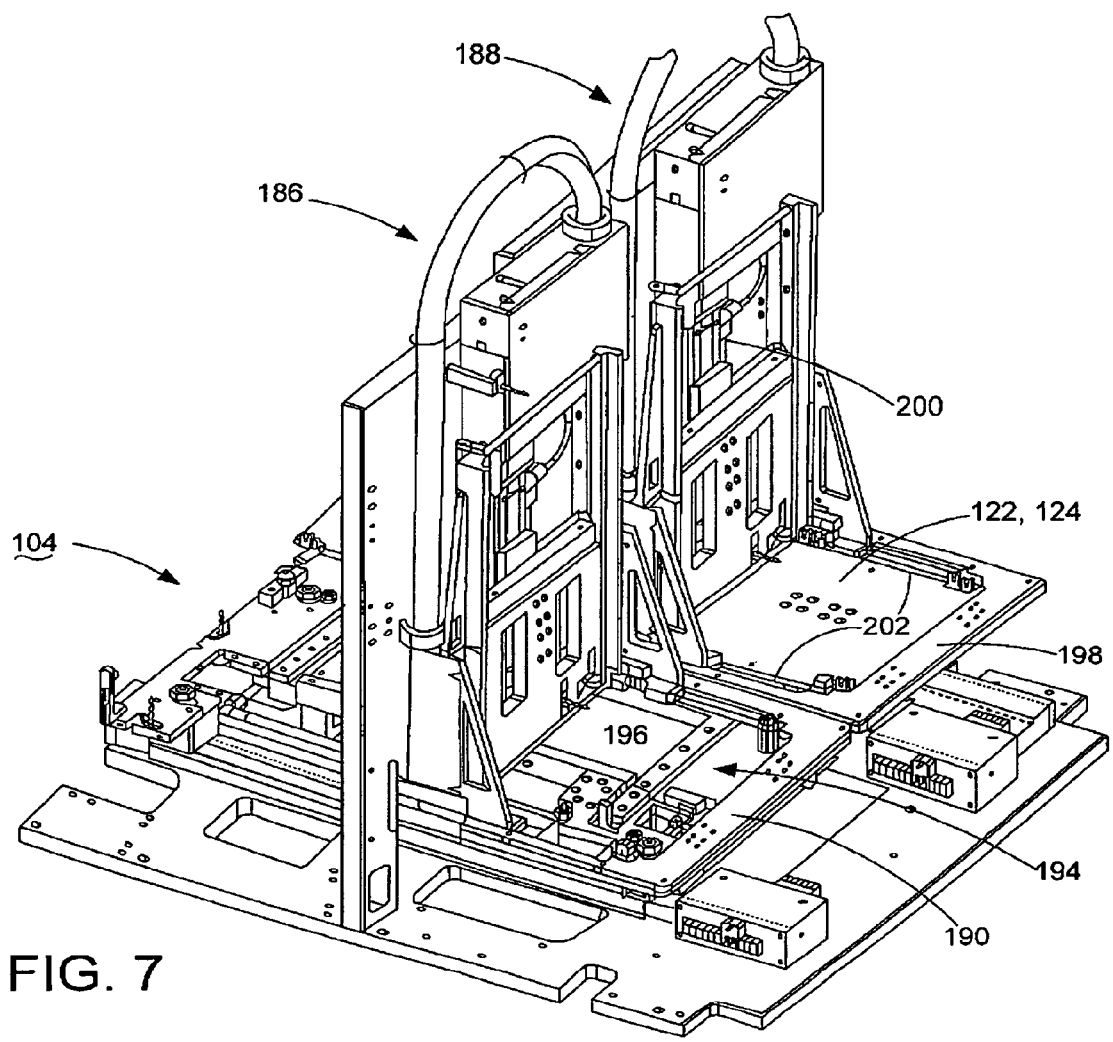
FIG. 7 depicts an isometric view of the tray feeder with an automated tray stacker and an automated tray destacker.

FIG. 7 is an isometric depiction of the tray feeder 104 described with respect to FIG. 4, with the addition of an automated tray stacker 186 for removing trays 108 from the pallets 118, 120, and an automated tray destacker 188 for placing trays 108 to the pallets 118, 120.

The tray stacker 186 has a framework 190 that is vertically moveable by a fluid powered cylinder 192. The framework 190 defines an opening 194 through which a tray 108 can pass. Retractable fingers 196 on opposing sides of the opening 194 are first retracted to pass the fingers 196 into operable alignment with the tray 108 to be removed. The fingers 196 are extended to contactingly engage the tray 108, and the framework 190 is then withdrawn to lift the tray 108 from the pallet 118, 120. The trays 108 stack up on the framework 190 as successive trays 108 are removed from the pallets 118, 120.

The tray destacker 188 works in basically the reverse. That is, a stack of trays 108 are placed on a framework 198 that is vertically moveable by another fluid powered cylinder 200. The framework 198 is lowered to place the bottom tray 108 in a stack onto the waiting pallet 118, 120. Fingers 202 are then retracted and the framework 198 moved upward to release the stack of trays 108 on the pallet 118, 120. The fingers 202 are then extended again to grippingly engage the next tray 108 up in the stack, and lift it and the rest of the stack of trays 108 away from the pallet 118, 120.

Figure 8:
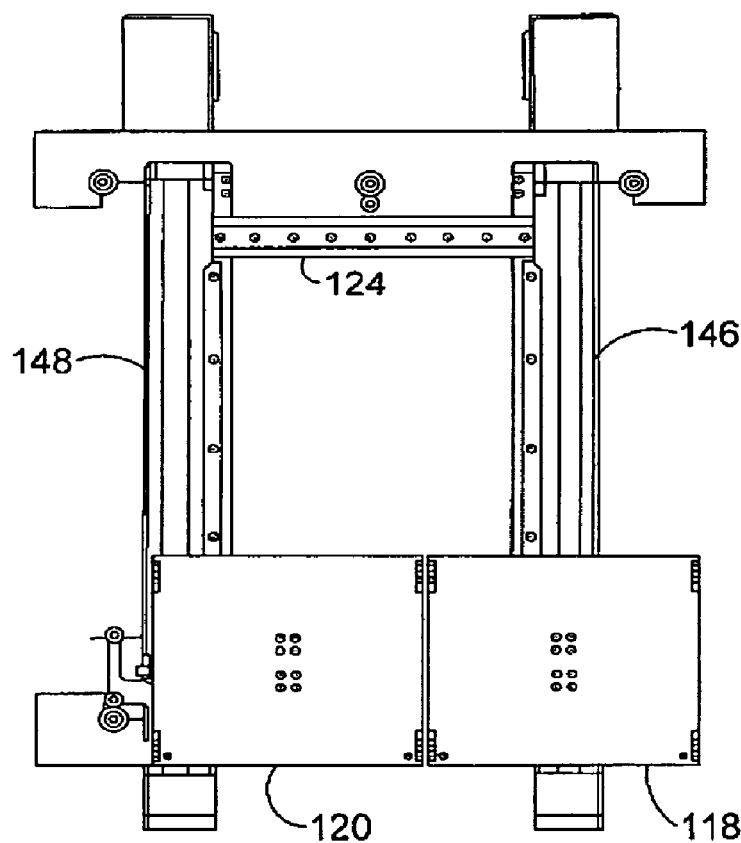
FIGS. 8-13 diagrammatically depict snapshots of the pallets as they traverse the rectangular path of travel.

FIGS. 8-13 depict snapshot steps within a method for continuously presenting the trays 108 (not shown) to the pick and place device 102 (not shown). FIG. 8 shows the pallets 118, 120 oriented in an end-to-end longitudinal alignment with pallet 118 leading pallet 120 in the counterclockwise path of travel. The controller 160 moves the pallets 118, 120 longitudinally along the stationary rail 122 and the shuttle rail 142 by selectively powering the respective set of motors to present rows of workpieces in the trays 108 to the pick and place device 102. In FIG. 8 the tray 108 supported by pallet 118 has been fully presented, such that rows in the tray 108 supported by pallet 120 are now being presented to the pick and place device 102.

FIGS. 9-13 depict the parallel processing by the controller 160 to incrementally move the pallet 120 to present rows of workpieces to the pick and place device 102 while simultaneously loading a new tray of workpieces to the pallet 118.

Figure 9:
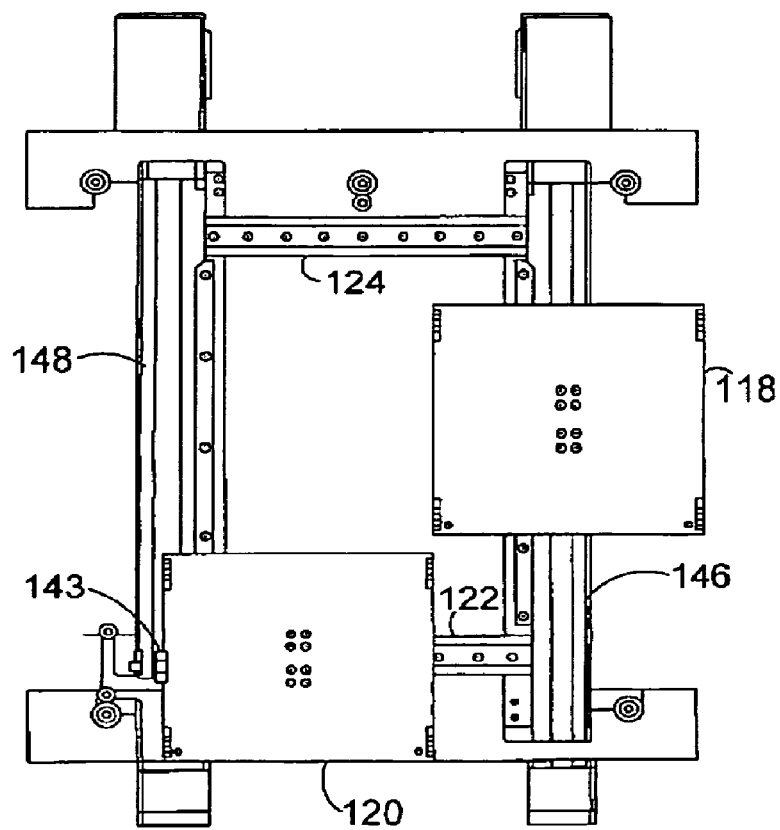
Figure 10:
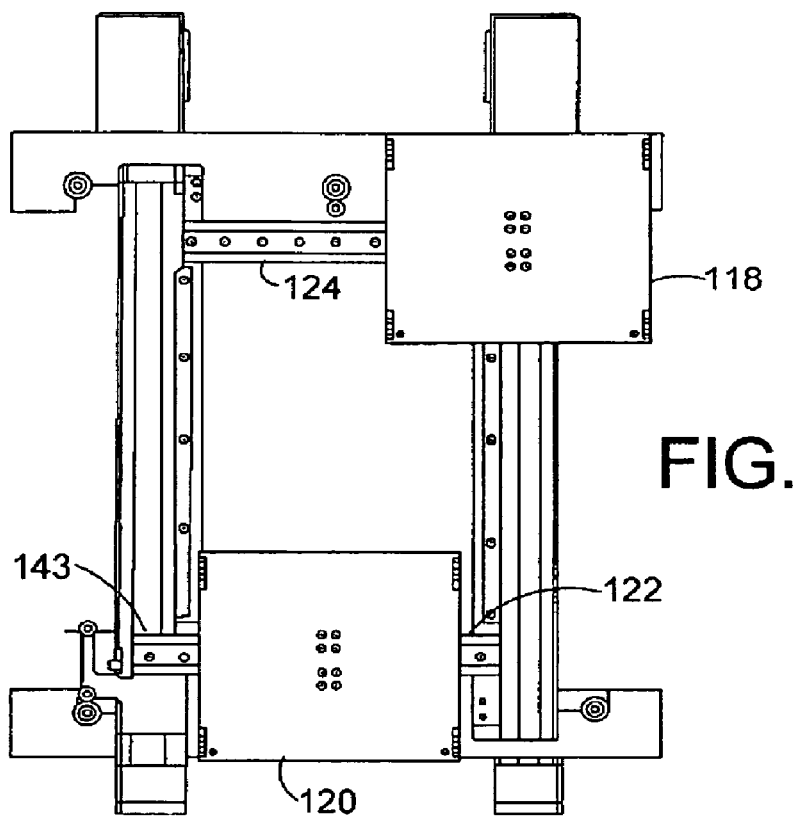
Figure 11:
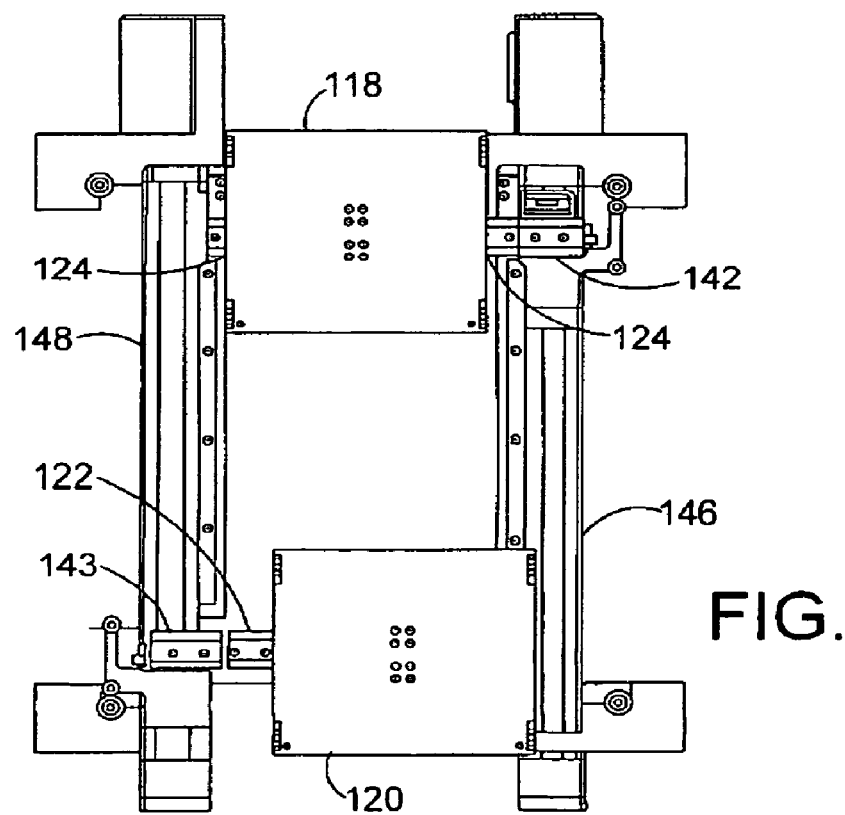

In FIG. 9 the controller 160 has actuated the fluid powered cylinder 146 to move the shuttle rail 142 into alignment with the other stationary rail 124. In FIG. 10 that alignment has been achieved, and the controller 160 dwells at that position long enough for the stacker 186 (FIG. 7) to remove the fully presented tray 108 from the pallet 118. In FIG. 11 the controller 160 moves the empty pallet 118 longitudinally on the shuttle rail 142 and then on the stationary rail 124, in an opposite direction as to that which it traversed the other stationary rail 122. The controller 160 will also actuate the other fluid powered cylinder 148 to move the other shuttle rail 143 into alignment with the stationary rail 124 before the pallet 118 reaches the end of the stationary rail 124. All the while, the controller 160 continues to incrementally advance the pallet 120 to continuously present rows of workpieces to the pick and place device 102.

Figure 12:
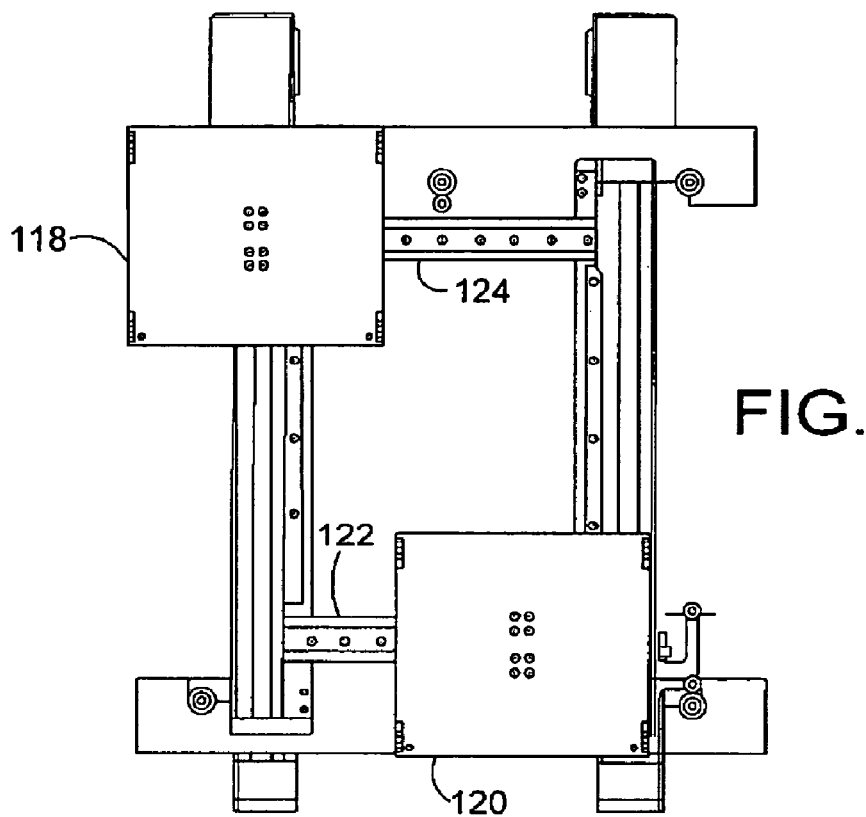
Figure 13:
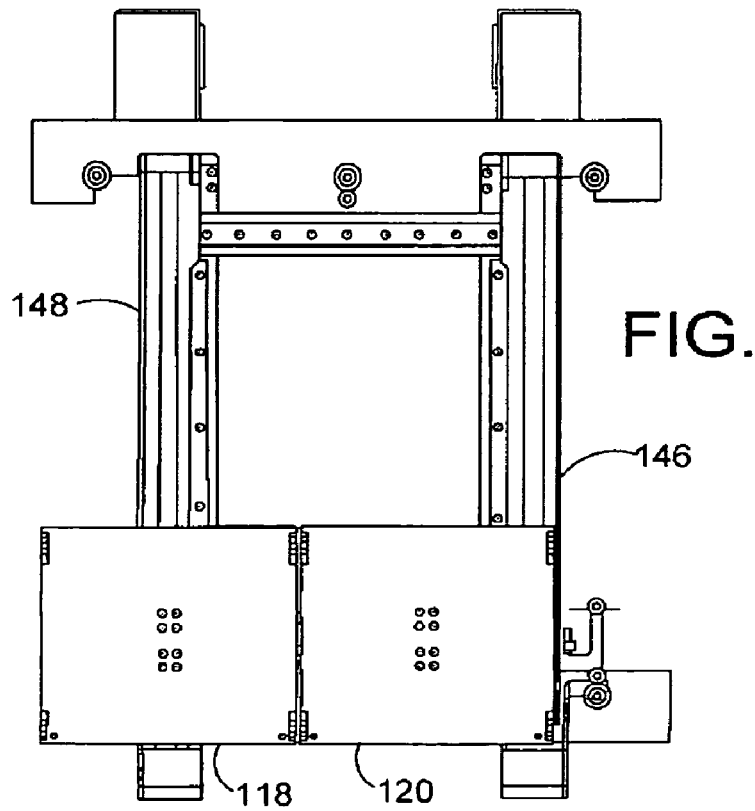

In FIG. 12 the pallet 118 is now supported upon the shuttle rail 143. Again, the controller 160 dwells at that position long enough for the destacker 188 (FIG. 7) to place a new tray 108 onto the pallet 118. FIG. 13 shows that when the other pallet 120 has been moved sufficiently to clear a space, the controller 160 will again actuate the fluid powered cylinder 148 to reorient the pallet 118 and the pallet 120 in the end-to-end longitudinal alignment, but now with pallet 120 leading pallet 118. The pallets 118, 120 are moved longitudinally until the tray 108 on pallet 120 is fully presented, and then the steps described above are repeated to replace the tray on pallet 120 while simultaneously presenting rows of the tray 108 on pallet 118 to the pick and place device 102.

The maximum throughput velocity with which the pallet 118, 120 can present a tray to the pick and place device 102 depends on the cycle time that is necessary for the pick and place device 102 to process all the workpieces in a row. Preferably, the pallets are cooperatively moved so that the new tray 108, such as the one being delivered by pallet 118 in FIG. 13, is available to the pick and place device 102 as if it were a physical continuation of the tray 108 on pallet 120. In other words, to provide an efficient, continuous and uninterrupted supply of workpieces 106, the pallet 118, 120 presenting the workpieces 106 is incrementally moved at a maximum throughput velocity. The other pallet 118, 120 is moved, unloaded, loaded, and reoriented in longitudinal alignment at a throughput velocity such that the cycle time necessary to process two adjacent rows presented in one of the pallets 118, 120 is substantially the same as the cycle time necessary to process the last row presented in one of the pallets 118, 120 and the first row presented of the other pallet 118, 120.

Generally, the claimed embodiments as described herein cover a workpiece presentment device incorporating a two-axis pick and place device and a means for presenting a continuous supply of workpieces to the pick and place device. For purposes of this description and meaning of the appended claims, the term "means for presenting" is expressly limited to the structural embodiments described herein and the structural equivalents thereof. That is, the term "means for presenting" does not include previously attempted solutions such as those employing a three-axis pick and place device, and such as those that momentarily starve the pick and place device for workpieces while a new tray is presented.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the claimed embodiments to the full extent indicated by the broad general meaning of the terms in which the appended claims are expressed. For example, the particular elements may vary in type or arrangement without departing from the spirit and scope of the claimed embodiments.

In addition, although the embodiments described herein are directed to presenting workpieces to an assembly line, it will be appreciated by those skilled in the art that the claimed subject matter is not so limited and various other systems can utilize the present embodiments without departing from the spirit and scope of the claimed invention.

What is claimed is:

1. A tray presentment system for a processing device, comprising:
   a pair of parallel stationary rails;
   first and second shuttle rails respectively disposed adjacent first and second ends of the stationary rails, each shuttle rail independently moveable laterally to a longitudinal alignment with a selected one of the pair of stationary rails; and
   a control circuit configured to circulate only two pallets simultaneously in the same rectangular path of travel to load trays to the pallets on one of the stationary rails while presenting the trays to the processing device on the other stationary rail.

2. The tray presentment system of claim 1 wherein the stationary rails and the shuttle rails define longitudinal slits at their adjacent ends so that bearing surfaces of the rails supporting the pallets during movement can deflect to compensate for any incidental misalignment.

3. The tray presentment system of claim 1 wherein the control system comprises fluid powered cylinders that selectively move the shuttle rails laterally.

4. The tray presentment system of claim 3 wherein the control system comprises motors that frictionally engage the pallets in moving them longitudinally along the rails.

5. The tray presentment system of claim 4 wherein the control system comprises a first set of motors that frictionally engage a first reference surface defined by each pallet when moving the pallets along one of the rails, and a second set of motors that frictionally engage a second reference surface defined by each pallet when moving the pallets along the other rail.

6. The tray presentment system of claim 5 wherein each motor directly drives a powered roller that is paired with a pinch roller to sandwichingly engage the reference surface between the rollers.

7. The tray presentment system of claim 6 wherein a base supporting the shuttle rail in lateral movement also supports a first pinch roller and a second pinch roller, the first pinch roller cooperating with a powered roller driven by a motor in the first set of motors to move each pallet on one of the rails and the second pinch roller cooperating another powered roller driven by a motor in the second set of motors to move each pallet on the other rail.

8. The tray presentment system of claim 6 wherein the stationary rail on which the pallets present trays to the processing device is sized to simultaneously move both pallets longitudinally in an end-to-end relationship, so that a cycle time associated with presenting two adjacent rows in one of the pallets is substantially the same as presenting the last row of one of the pallets and the first row of the other pallet.

9. The tray presentment system of claim 1 comprising an automated tray stacker that removes trays from the pallets.

10. The tray presentment system of claim 1 comprising an automated tray destacker that places trays to the pallets.

11. A method for presenting trays to a processing device, comprising:
    (a) orienting first and second pallets supporting first and second trays, respectively, in an end-to-end longitudinal alignment with the first pallet leading the second pallet;
    (b) moving the pallets in a first direction to present rows of the trays to the processing device;
    (c) shuttling the first pallet laterally out of the longitudinal alignment when all its rows have been presented;
    (d) moving the first pallet in a second direction substantially opposite the first direction while continuing to move the second pallet in the first direction to present rows to the processing device;
    (e) placing another tray on the first pallet;
    (f) shuttling the first pallet laterally to reorient the first and second pallets in the end-to-end longitudinal alignment with the second pallet leading the first pallet; and
    (g) moving the pallets in the first direction to present rows of the trays to the processing device.

12. The method of claim 11 comprising:
    (h) shuttling the second pallet laterally out of the longitudinal alignment when all its rows have been presented;
    (i) moving the second pallet in the second direction while continuing to move the first pallet in the first direction to present rows to the pick and place device;
    (j) placing another tray on the second pallet;
    (k) shuttling the second pallet laterally to reorient the first and second pallets in the end-to-end longitudinal alignment with the first pallet leading the second pallet; and
    (l) moving the pallets in the first direction to present rows of the trays to the processing device.

13. The method of claim 12 comprising repeating steps (c) through (l) sequentially until a predetermined number of trays has been presented.

14. The method of claim 13 wherein steps (e) and (j) comprise extending an automated end effector to remove a tray from the pallet.

15. The method of claim 13 wherein steps (e) and (j) comprise extending an automated end effector to place a tray on the pallet.

16. The method of claim 13 wherein steps (b), (g), and (l) comprise incrementally moving at least one of the pallets to present each row to the processing device for an interval associated with a cycle time necessary to process the entire row.

17. The method of claim 16 wherein steps (b), (g), and (l) comprise cooperatively moving both pallets so that a cycle time necessary to process two adjacent rows presented in one of the pallets is substantially the same as a cycle time necessary to process the last row presented in one of the trays and the first row presented in the other tray.

18. The method of claim 13 wherein steps (b), (d), (g), (i), and (l) are characterized by moving the pallets by frictionally engaging a reference surface of each pallet between a powered roller and a pinch roller, and position controlling the pallets by encoders.

19. The method of claim 13 wherein steps (c), (f), (h), and (k) are characterized by moving the pallets with fluid powered cylinders.

20. A workpiece presentment system, comprising:
    an only two-axis pick and place device; and
    means for presenting a continuous supply of workpieces to the pick and place device.

* * * * *